United States Patent
Tseng (10) Patent No.: US 9,299,506 B2
(45) Date of Patent: Mar. 29, 2016

(54) LIMIT SWITCH AND LINEAR ACTUATOR HAVING THE SAME

(71) Applicant: TIMOTION TECHNOLOGY CO., LTD., New Taipei (TW)

(72) Inventor: Kuan-Shu Tseng, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 232 days.

(21) Appl. No.: 13/971,488

(22) Filed: Aug. 20, 2013

(65) Prior Publication Data

US 2015/0008102 A1 Jan. 8, 2015

(30) Foreign Application Priority Data

Jul. 5, 2013 (TW) .............................. 102124130 A (51) Int. Cl.
*H01H 3/16* (2006.01)
*F16H 25/20* (2006.01)
(Continued)

(52) U.S. Cl.
CPC .............. *H01H 3/16* (2013.01); *F16H 25/2015* (2013.01); *H01H 13/18* (2013.01); *H01H 13/28* (2013.01); *F16H 2025/2084* (2013.01); *H01H 2231/038* (2013.01)

(58) Field of Classification Search
CPC . H01H 3/16; H01H 21/285; H01H 2020/287; H01H 13/52; H01H 13/12; H01H 5/20; H01H 9/04; H01H 13/18; H01H 2231/038; H01H 13/28; F16H 25/2015; F16H 2025/2084
USPC .................. 200/47, 402–427, 302.1; 439/402
See application file for complete search history.

(56) References Cited

U.S. PATENT DOCUMENTS 4,673,778 A * 6/1987 Lewandowski et al. ...... 200/467
5,743,387 A * 4/1998 Hung ............................ 200/571
(Continued)

FOREIGN PATENT DOCUMENTS

DE 102011017170 A1 10/2012
EP 1130611 A1 9/2001
(Continued)

OTHER PUBLICATIONS

Office Action dated Mar. 6, 2015 of the corresponding Taiwan patent application No. 102124130.
(Continued)

*Primary Examiner* — Edwin A. Leon
(74) *Attorney, Agent, or Firm* — Chun-Ming Shih; HDLS IPR Services (57) ABSTRACT

In a linear actuator, a limit switch includes an insulation housing formed with an opening and plural slots; a press block disposed on the insulation housing and exposed outside the opening; a pair of connection pins disposed in the insulation housing and spaced with an interval, and respectively protruded from the slots; an elastic connection guiding set including an elastic unit pressed by the press block and a connection guiding sheet connected to the elastic unit, wherein the connection guiding sheet are connected to the pair of connection pins; and a diode disposed in the insulation housing and including two guide pins, wherein the two guide pins are respectively and correspondingly connected to the pair of connection pins in the insulation housing. Accordingly, the electrical connection for the limit switch is simplified thereby facilitating automatic production.

18 Claims, 6 Drawing Sheets

(51) Int. Cl.
*H01H 13/18* (2006.01)
*H01H 13/28* (2006.01)

(56) References Cited

U.S. PATENT DOCUMENTS

| | | | | |
|---|---|---|---|---|
| 5,871,087 | A * | 2/1999 | Su | H01H 13/28 200/462 |
| 6,096,990 | A * | 8/2000 | Marin | H01H 1/58 200/284 |
| 6,321,611 | B1 * | 11/2001 | Szu et al. | 74/89.37 |
| 6,914,507 | B2 * | 7/2005 | Fujiu | F16D 27/112 336/192 |
| 7,872,204 | B2 * | 1/2011 | Lin | 200/302.1 |
| 8,633,412 | B2 * | 1/2014 | Mori | H01H 5/06 200/462 |
| 8,658,928 | B2 * | 2/2014 | Takayuki | H01H 3/60 200/288 |
| 2005/0264109 | A1 * | 12/2005 | Abrahamsen | 310/20 |
| 2009/0321228 | A1 | 12/2009 | Lin | |
| 2011/0079486 | A1 | 4/2011 | Tseng | |

FOREIGN PATENT DOCUMENTS

| | | |
|---|---|---|
| JP | 02134621 U | 11/1990 |
| JP | 07174204 A | 7/1995 |
| JP | 2000304120 A | 11/2000 |
| JP | 2002056745 A | 2/2002 |
| TW | M322016 U | 11/2007 |
| TW | M479364 U | 6/2014 |
| WO | 2006086981 A1 | 8/2006 |

OTHER PUBLICATIONS

Japan Official Action issued on Jun. 10, 2014.
Search Report dated Jul. 29, 2014 of the corresponding European patent application No. 13186916.6.

* cited by examiner

ND LINEAR ACTUATOR
LIMIT SWITCH AND LINEAR ACTUATOR HAVING THE SAME

BACKGROUND OF THE INVENTION

1. Field of the Invention

The present invention relates to a limit switch, especially to a limit switch used in a linear actuator.

2. Description of Related Art

A linear actuator is widely adopted in the medical equipment such as a hospital bed or electric chair or other fields where a retractable movement is required.

A conventional linear actuator includes a drive unit, a transmission device, a retractable tube and two limit switches. When the retractable tube is forwardly moved and in contact with one of the limit switches, the power supply for the forward movement of the drive unit is terminated, thereby only allowing the retractable tube to be backwardly moved; on the other hand, when the retractable tube is backwardly moved and in contact with the other limit switch, the power supply for the backward movement of the drive unit is terminated, thereby only allowing the retractable tube to be forwardly moved. As such, the forward and backward movements of the retractable tube can be controlled through the two limit switches while supplying electric power.

Figure 1:
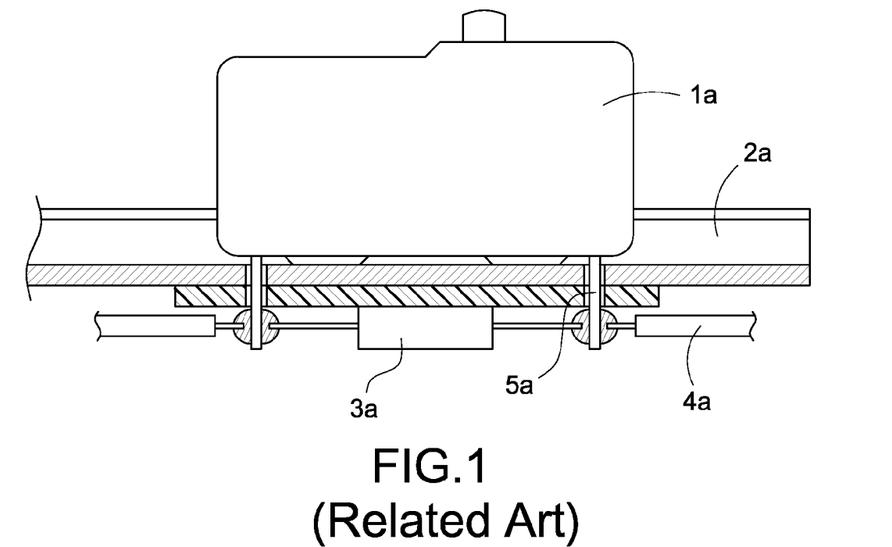
FIG. 1 is a schematic view showing the installation of the limit switch of a conventional linear actuator.

Please refer to FIG. 1, which is a schematic view showing the installation of the limit switch of a conventional linear actuator. A limit switch (1a) of the linear actuator is disposed on a support plate (2a), and the support plate (2a) is further installed with a diode (3a) and a wire (4a). The limit switch (1a) takes advantage of the rectifying function provided by the diode (3a) to allow the current to only flow in one direction and to block the current flowing in the reverse direction. In assembly, external connection pins (5a) of the limit switch (1a) are protruded from the support plate (2a), then the diode (3a) and the wire (4a) are electrically connected to the connection pins (5a) of the limit switch (1a) with a manual welding manner, such that the signal of the limit switch (1a) and the diode (3a) is enabled to be transferred to a control unit through the wire (4a).

However in the mentioned structure, the manual welding manner for connecting the limit switch (1a) and the diode (3a) is time consuming, labor consuming and not easy to be positioned, thereby causing difficulty in assembly.

In view of the mentioned disadvantage, the applicant of the present invention has devoted himself for providing a novel design to improve the mentioned disadvantage.

SUMMARY OF THE INVENTION

The present invention is to provide a limit switch, wherein a diode welding process is not used thereby simplifying the electrical connection of the limit switch and facilitating the automatic production.

Accordingly, the present invention provides a limit switch, which includes an insulation housing, a press block, a pair of connection pins, an elastic connection guiding set and a diode. The insulation housing is formed with an opening and plural slots. The press block is disposed on the insulation housing and exposed outside the opening. The pair of connection pins are disposed in the insulation housing and spaced with an interval, and respectively protruded from the slots. The elastic connection guiding set includes an elastic unit pressed by the press block and a connection guiding sheet connected to the elastic unit, and two ends of the connection guiding sheet are respectively and correspondingly connected to the pair of connection pins. The diode is disposed in the insulation housing and includes two guide pins, and the two guide pins are respectively and correspondingly connected to the pair of connection pins in the insulation housing.

The present invention is to provide a linear actuator having a limit switch, wherein a welding operation between the limit switch and a diode is not used thereby simplifying the electrical connection process for the limit switch and facilitating the automatic production.

Accordingly, the present invention provides a linear actuator having a limit switch, which includes a housing, a transmission device and at least a limit switch. The transmission device is disposed in the housing. The limit switch is disposed in the housing and is actuated through being contacted by the transmission device, and the limit switch includes an insulation housing, a press block, a pair of connection pins, an elastic connection guiding set and a diode. The insulation housing is formed with an opening and plural slots. The press block is disposed on the insulation housing and exposed outside the opening. The pair of connection pins is disposed in the insulation housing and spaced with an interval, and respectively protruded from the slots. The elastic connection guiding set includes an elastic unit pressed by the press block and a connection guiding sheet connected to the elastic unit, and two ends of the connection guiding sheet are respectively and correspondingly connected to the pair of connection pins. The diode is disposed in the insulation housing and includes two guide pins, and the two guide pins are respectively and correspondingly connected to the pair of connection pins in the insulation housing.

In comparison with the related art, the present invention has advantageous features as follows. The linear actuator provided by the present invention has its power supply controlled through the diode and the limit switch. The interior of the limit switch is installed with the diode, so there is no need for additionally welding a diode on the external connection pin of the limit switch thereby avoiding the welding process required in the convention, so the assembly process is simplified, the labor is saved and the automatic production is facilitated.

DETAILED DESCRIPTION OF THE INVENTION

Preferred embodiments of the present invention will be described with reference to the drawings.

Figure 2:
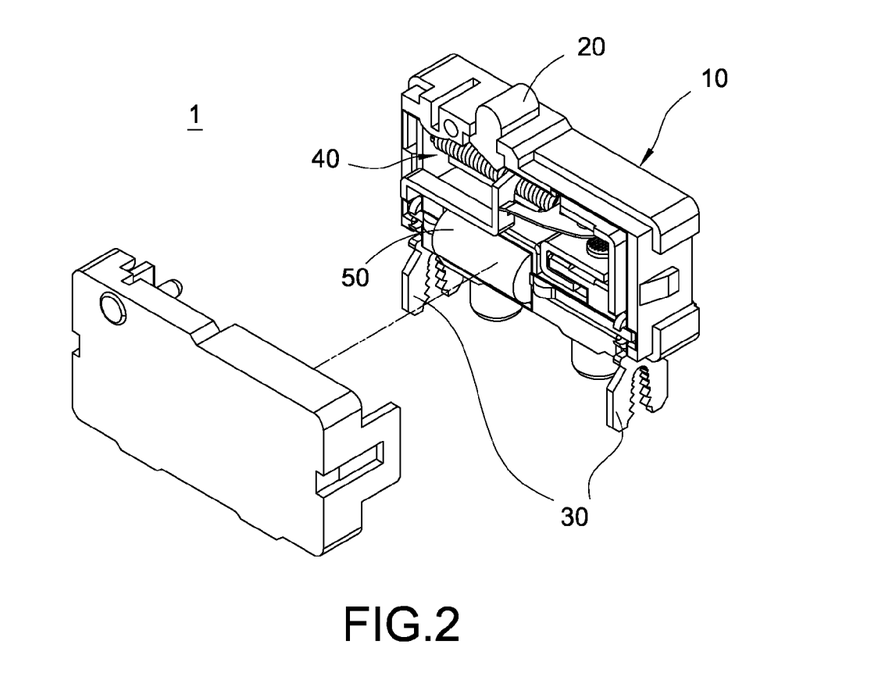
FIG. 2 is a schematic view showing the assembly of the limit switch according to a first embodiment of the present invention.
Figure 3:
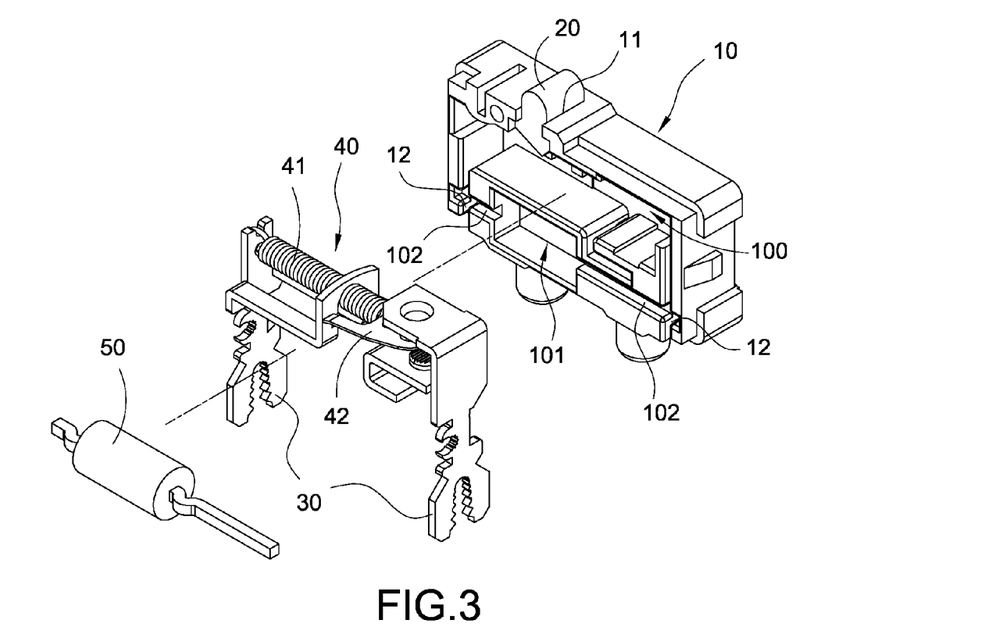
FIG. 3 is a perspective exploded view showing the limit switch according to the first embodiment of the present invention.
Figure 4:
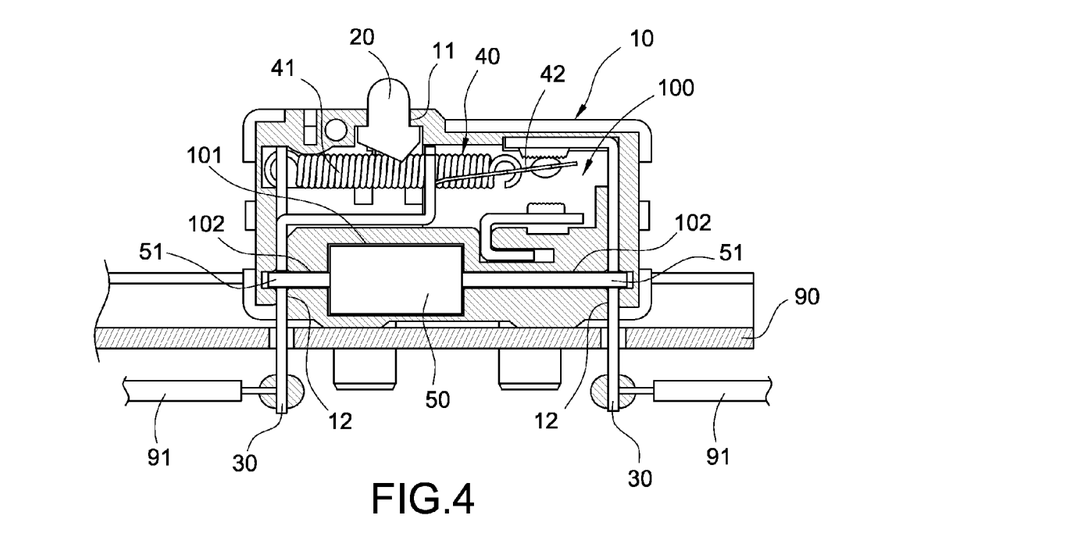
FIG. 4 is a cross sectional view showing the assembly of the limit switch according to the first embodiment of the present invention.

Please refer to FIG. 2 to FIG. 4, wherein FIG. 2 is a schematic view showing the assembly of the limit switch according to a first embodiment of the present invention; FIG. 3 is a perspective exploded view showing the limit switch according to the first embodiment of the present invention; and FIG. 4 is a cross sectional view showing the assembly of the limit switch according to the first embodiment of the present invention. According to the present invention, the limit switch (1) includes an insulation housing (10), a press block (20), a pair of connection pins (30), an elastic connection guiding set (40) and a diode (50). The press block (20) is disposed on the insulation housing (10), the elastic connection guiding set (40) and the diode (50) are disposed in the insulation housing (10), the pair of connection pins (30) is respectively protruded from the insulation housing (10) thereby providing an electrical connection function.

The insulation housing (10) is made of an insulation material, e.g. plastic. The insulation housing (10) is formed with a first accommodation space (100), an opening (11) and plural slots (12), and the opening (11) and the plural slots (12) are communicated with the first accommodation space (100). According to this embodiment, the insulation housing (10) is formed with a second accommodation space (101) in the first accommodation space (100), and formed with two insertion slits (102) communicated with the first accommodation space (100) and the second accommodation space (101).

The press block (20) is disposed on the top surface of the insulation housing (10) and abutted against the opening (11), and protruded from the opening (11) thereby being partially exposed outside the opening (11). The pair of connection pins (30) is respectively disposed in the first accommodation space (100) and spaced with an interval, and respectively protruded from the plural slots (12) thereby being enabled to be electrically connected to other electric components.

The elastic connection guiding set (40) includes an elastic unit (41) pressed by the press block (20) and a connection guiding sheet (42) connected to the elastic unit (41). The elastic unit (41) can be a spring, and the elastic unit (41) is elastically abutted against the press block (20). One end of the elastic unit (41) is fastened on one of the connection pins (30), and the other end is fastened on the connection guiding sheet (42). Two ends of the connection guiding sheet (42) are respectively and correspondingly connected to the pair of connection pins (30). According to this embodiment, one end of the elastic unit (41) is fastened on one of the connection pins (30), and the other end is fastened on the connection guiding sheet (42).

The diode (50) is disposed in the insulation housing (10). The diode (50) is formed with two guide pins (51). The two guide pins (51) are respectively and correspondingly connected to the pair of connection pins (30) in the insulation housing (10). The two guide pins (51) are respectively and correspondingly inserted in the two insertion slits (102) and electrically connected to the pair of connection pins (30), thereby enabling the diode (50) to be positioned in the second accommodation space (101).

When the limit switch (1) is in use, one end of the connection guiding sheet (42) is connected to one of the connection pins (30), the other end is connected to the other connection pin (30), and at this moment, the limit switch (1) is in a conductive status. When the press block (20) is pressed by an external force, the press block (20) is downwardly moved thereby pressing the elastic unit (41), the connection guiding sheet (42) is driven by the elastic unit (41) so as to be released from the other connection pin, and at this moment, the limit switch (1) is a non-conductive status.

Figure 5:
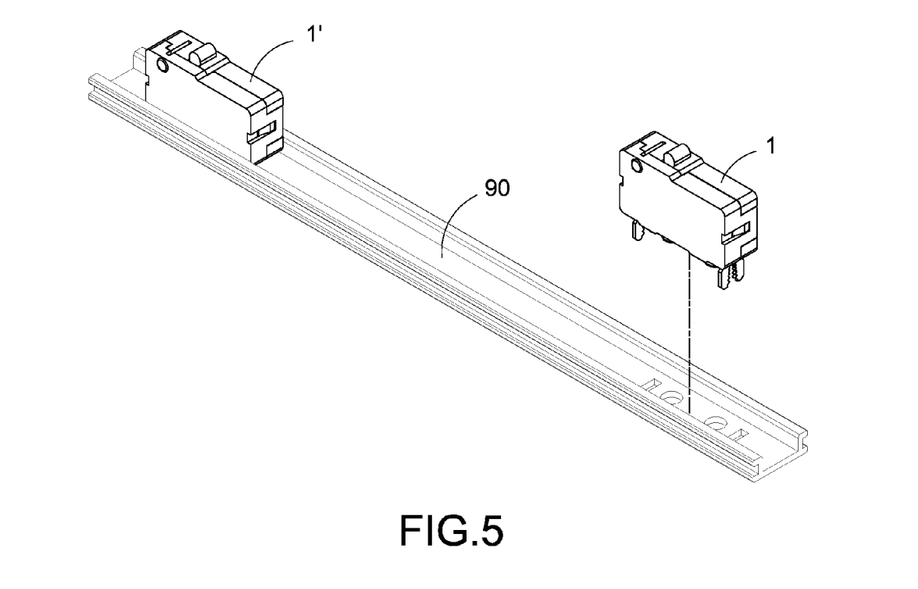
FIG. 5 is a schematic view showing the installation of the limit switch according to the first embodiment of the present invention.
Figure 6:
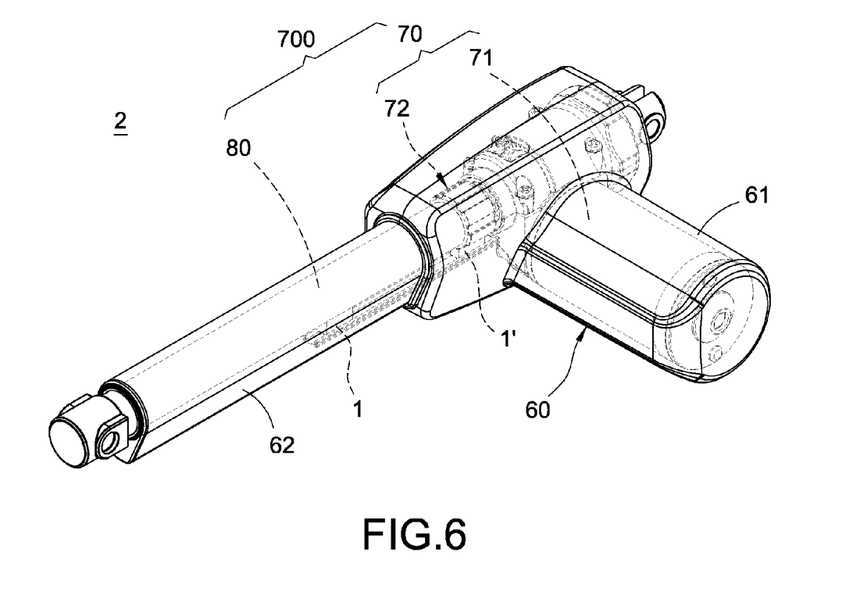
FIG. 6 is a schematic view showing a linear actuator having the limit switch according to the first embodiment of the present invention.

Please refer to FIG. 5 and FIG. 6, wherein FIG. 5 is a schematic view showing the installation of the limit switch according to the first embodiment of the present invention; and FIG. 6 is a schematic view showing a linear actuator having the limit switch according to the first embodiment of the present invention. The limit switch (1) provided by the present invention is able to be applied in a linear actuator (2) for controlling the forward and backward movement of the linear actuator (2). The linear actuator (2) includes a housing (60), a transmission device (700) and at least a limit switch (1), according to this embodiment, two limit switches (1, 1') are adopted. The structure of the two limit switches (1, 1') has been disclosed above; therefore no further illustration is provided. The two limit switches (1, 1') are disposed in the housing (60) and spaced with an interval, and actuated through being contacted by the transmission device (700).

The hosing (60) can be made of a plastic material, and includes a base (61) and an outer tube (62) connected at the front of the base (61), wherein the base (61) and the outer tube (62) can be integrally formed. According to this embodiment, the transmission device (700) includes an actuation mechanism (70) and a retractable tube (80). The actuation mechanism (70) is disposed in the base (61) of the housing (60), and includes a motor (71) and a transmission set (72) driven by the motor (71). The retractable tube (80) is driven by the transmission set (72) for being protruded out or retracted in the housing (60).

According to this embodiment, the linear actuator (2) further includes a support plate (90) and a wire (91) (as shown in FIG. 4). The two limit switches (1, 1') are disposed on a lateral surface of the support plate (90), and the wire (91) is disposed on another lateral surface of the support plate and electrically connected to the pair of connection pins (30). In addition, the two limit switches (1, 1') are disposed on the support plate (90) and spaced with an interval.

Figure 7:
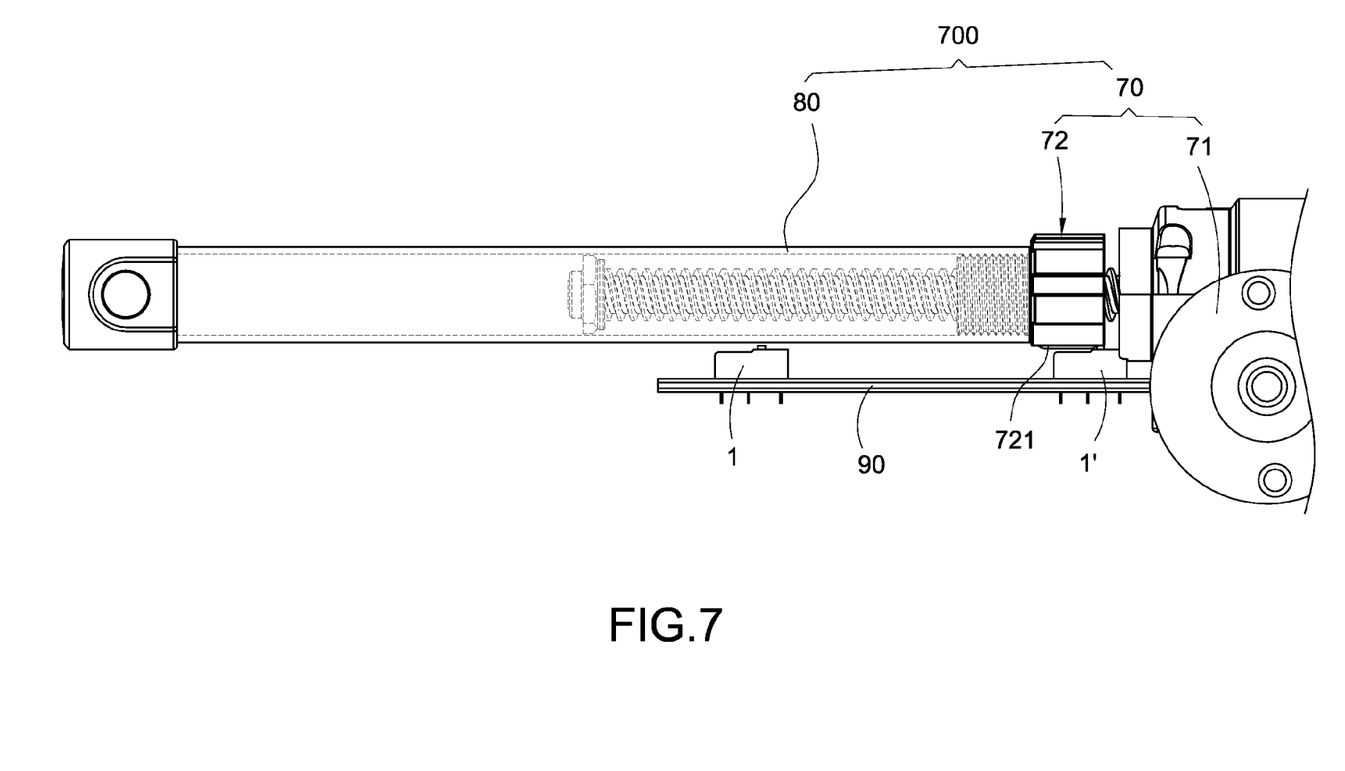
FIG. 7 is a schematic view illustrating one application of the linear actuator having the limit switch according to the first embodiment of the present invention.

Please refer to FIG. 7, which is a schematic view illustrating one application of the linear actuator having the limit switch according to the first embodiment of the present invention. According to this embodiment, the two limit switches (1, 1') are actuated through being contacted by the transmission set (72), and the transmission set (72) includes a first actuation unit (721). As such, when the transmission set (72) is forwardly moved, the first actuation unit (72) is in contact with one of the limit switches (1), and at this moment, the power supply for the forward movement of the actuation mechanism (70) is terminated; on the other hands, when the transmission set (72) is backwardly moved, the first actuation unit (721) is in contact with the other limit switch (1'), and at this moment, the power supply for the backward movement of the actuation mechanism (70) is terminated. Accordingly, the movements of the transmission set (72) can be controlled through the two limit switches (1, 1') while supplying electric power.

Figure 8:
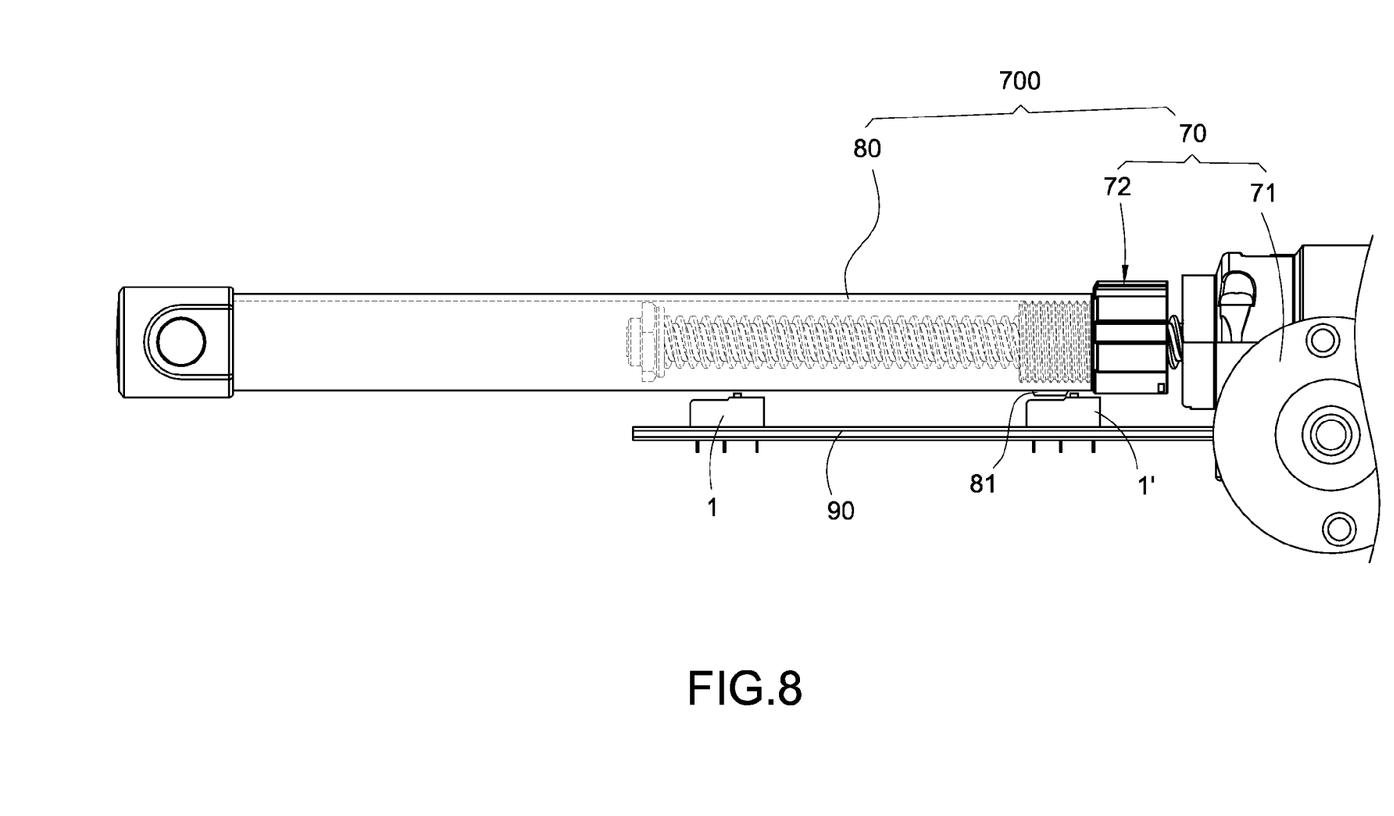
FIG. 8 is a schematic view illustrating another application of the linear actuator having the limit switch according to the first embodiment of the present invention.

Please refer to FIG. 8, which is a schematic view illustrating another application of the linear actuator having the limit switch according to the first embodiment of the present invention. The technical feature disclosed in FIG. 8 is substantially the same as that disclosed in FIG. 7, the difference is that the two limit switches (1, 1') are actuated through being contacted by the retractable tube (80), and the retractable tube (80)

includes a second actuation unit (81). When the retractable tube (80) is forwardly moved, the second actuation unit (81) is in contact with one of the limit switches (1), and at this moment, the power supply for the forward movement of the actuation mechanism (70) is terminated; on the other hands, when the retractable tube (80) is backwardly moved, the second actuation unit (81) is in contact with the other limit switch (1'), and at this moment, the power supply for the backward movement of the actuation mechanism (70) is terminated.

Figure 9:
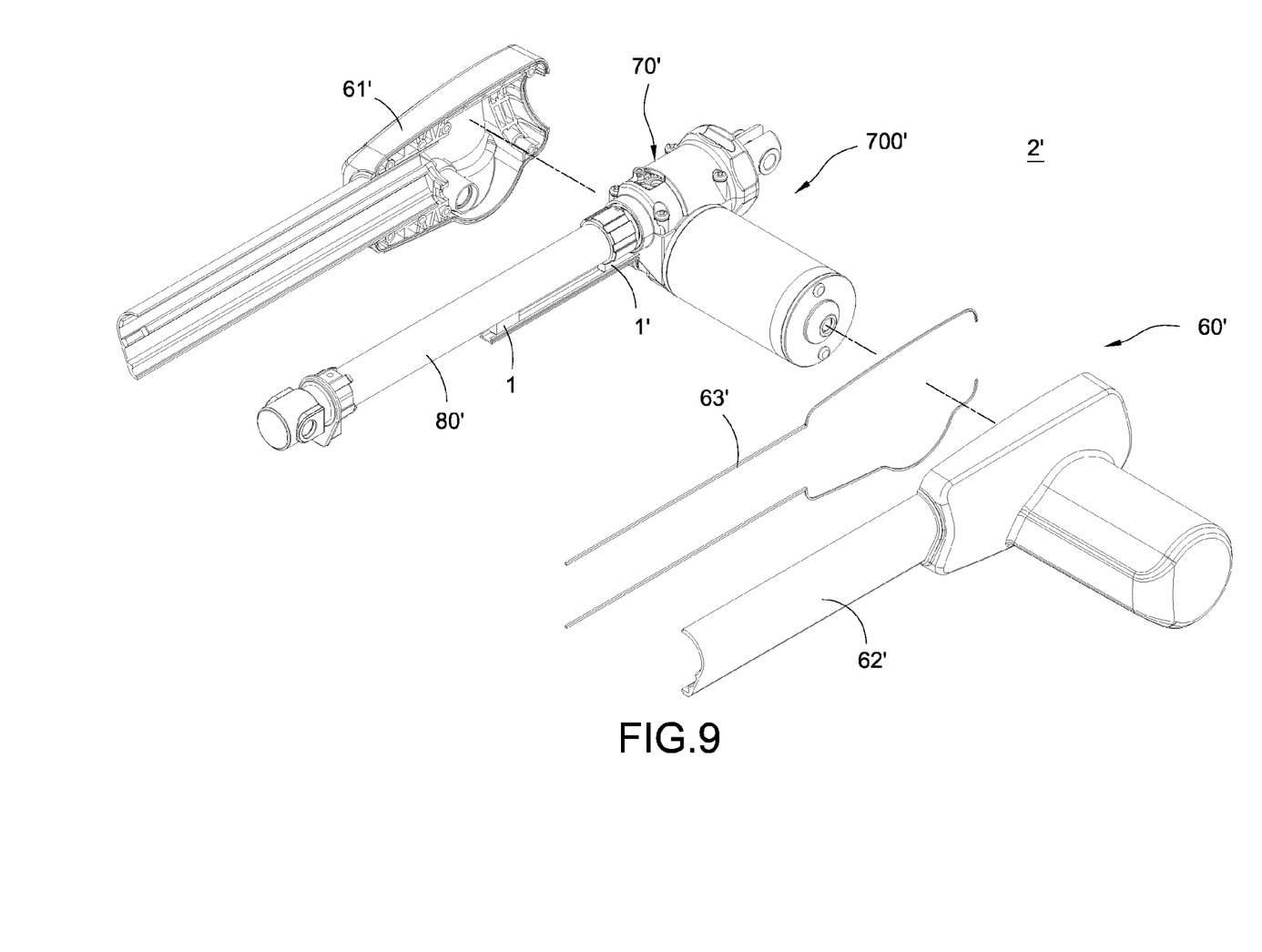
FIG. 9 is a schematic view showing the housing of the linear actuator having the limit switch according to a second embodiment of the present invention.

Please refer to FIG. 9, which is a schematic view showing the housing of the linear actuator having the limit switch according to a second embodiment of the present invention. This embodiment is substantially the same as the previous embodiment, a linear actuator (2') includes a housing (60'), a transmission device (700') (including an actuation mechanism (70') and a retractable tube (80')) and two limit switches (1, 1'). The difference between this embodiment and the previous embodiment is the status of the housing (60'). According to this embodiment, the housing (60') includes a first shell (61') and a second shell (62') capable of engaging with each other. Preferably, the housing (60') further includes a waterproof adhesive strip (63') disposed at the location where the first shell (61') and the second shell (62') being engaged, thereby providing a sealing feature to the housing (60').

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A limit switch (1, 1') comprising:
   an insulation housing (10), formed with an opening (11) and plural slots (12);
   a press block (20), disposed on the insulation housing (10) and exposed outside the opening (11);
   a pair of strip-shaped connection pins (30), disposed in the insulation housing (10) and spaced with an interval, and respectively protruded from the slots (12);
   an elastic connection guiding set (40), including an elastic unit (41) pressed by the press block (20) and a connection guiding sheet (42) connected to the elastic unit (41), two ends of the connection guiding sheet (42) being respectively and correspondingly connected to the pair of connection pins (30); and
   a diode (50), disposed in the insulation housing (10), and including two guide pins (51), the two guide pins (51) being respectively and correspondingly connected to the pair of connection pins (30) in the insulation housing (10);
   wherein each of the strip-shaped connection pins (30) integrally forms a saw-tooth protrusion protruded therefrom; the two guide pins (51) of the diode (50) are respectively and directly clamped by the saw-tooth protrusions of the connection pins (30), and the saw-tooth protrusions further penetrate the insulation housing (10) to electrically connect to a wire (91).

2. The limit switch (1, 1') according to claim 1, wherein the insulation housing (10) is formed with a first accommodation space (100), and the opening (11) and the plural slots (12) are communicated with the first accommodation space (100).

3. The limit switch (1, 1') according to claim 1, wherein the insulation housing (10) is formed with a second accommodation space (101) in the first accommodation space (100), and the diode (50) is positioned in the second accommodation space (101).

4. The limit switch (1, 1') according to claim 3, wherein the insulation housing (10) is formed with two insertion slits (102) communicated with the first accommodation space (100) and the second accommodation space (101), respectively, and the two guide pins (50) are respectively and correspondingly protruded from the two insertion slits (102) for being electrically connected to the pair of connection pins (30).

5. The limit switch (1, 1') according to claim 1, wherein the elastic unit is a spring (41), and one end of the spring is fastened on one of the connection pins (30) and the other end is fastened on the connection guiding sheet (42).

6. A linear actuator (2, 2') comprising:
   a housing (60, 60');
   a transmission device (700, 700') disposed in the housing (60, 60');
   at least a limit switch (1, 1'), disposed in the housing (60, 60') and actuated through being contacted by the transmission device (700, 700'), the limit switch (1, 1') including:
      an insulation housing (10), formed with an opening (11) and plural slots (12);
      a press block (20), disposed on the insulation housing (10) and exposed outside the opening (11);
      a pair of strip-shaped connection pins (30), disposed in the insulation housing (10) and spaced with an interval, and respectively protruded from the slots (12);
      an elastic connection guiding set (40) including an elastic unit (41) pressed by the press block (20) and a connection guiding sheet (42) connected to the elastic unit (41), two ends of the connection guiding sheet (42) being respectively and correspondingly connected to the pair of connection pins (30); and
      a diode (50), disposed in the insulation housing (10), and including two guide pins (51), the two guide pins (51) being respectively and correspondingly connected to the pair of connection pins (30) in the insulation housing (10); and
   a support plate (90) and a wire (91), wherein the limit switch (1, 1') is disposed on a lateral surface of the support plate (90), and the wire (91) is disposed on another lateral surface of the support plate (90);
   wherein each of the strip-shaped connection pins (30) integrally forms a saw-tooth protrusion protruded therefrom; the two guide pins (51) of the diode (50) are respectively and directly clamped by the saw-tooth protrusions of the connection pins (30), and the saw-tooth protrusions further sequentially penetrate the insulation housing (10) and the support plate (90) to electrically connect to the wire (91).

7. The linear actuator (2, 2') according to claim 6, wherein the transmission device (700, 700') includes an actuation mechanism (70, 70'), the actuation mechanism (70, 70') includes a motor (71) and a transmission set (72) driven by the motor (71), and the limit switch (1, 1') is actuated through being contacted by the transmission set (72).

8. The linear actuator (2, 2') according to claim 6, wherein the transmission device (700, 700') further includes a retractable tube (80, 80'), and the retractable tube (80, 80') is driven by a transmission set (72) for being protruded out or retracted in the housing (60, 60').

9. The linear actuator (2, 2') according to claim 8, wherein the limit switch (1, 1') is actuated through being contacted by the retractable tube (80, 80').

10. The linear actuator (2, 2') according to claim 6, wherein the insulation housing (10) is formed with a first accommodation space (100), and the opening (11) and the plural slots (12) are communicated with the first accommodation space (100).

11. The linear actuator (2, 2') according to claim 6, wherein the insulation housing (10) is formed with a second accommodation space (101) in the first accommodation space (100), and the diode (50) is positioned in the second accommodation space (101).

12. The linear actuator (2, 2') according to claim 6, wherein the insulation housing (10) is formed with two insertion slits (102) communicated with the first accommodation space (100) and the second accommodation space (101), respectively, and the two guide pins (51) are respectively and correspondingly protruded from the two insertion slits (102) for being electrically connected to the pair of connection pins (30).

13. The linear actuator (2, 2') according to claim 6, wherein one end of a spring is fastened on one of the connection pins (30) and the other end is fastened on the connection guiding sheet (42).

14. The linear actuator (2, 2') according to claim 6, wherein the housing (60, 60') includes a base (61) and an outer tube (62) connected at the front of the base (61).

15. The linear actuator (2, 2') according to claim 14, wherein the base (61) and the outer tube (62) are integrally formed.

16. The linear actuator (2, 2') according to claim 6, wherein the housing (60') includes a first shell (61') and a second shell (62') capable of engaging with each other.

17. The linear actuator (2, 2') according to claim 16, wherein the housing (60') further includes a waterproof adhesive strip (63') disposed at the location where the first shell (61') and the second shell (62') are engaged.

18. The linear actuator (2, 2') according to claim 6, wherein the housing (60') is made of a plastic material.

* * * * *